(12) United States Patent
Shih et al.

(10) Patent No.: US 10,659,645 B2
(45) Date of Patent: May 19, 2020

(54) GUIDING STRUCTURE ADAPTED FOR A SCANNER AND CAPABLE OF PREVENTING IMAGE DISTORTION AND SCANNER THEREWITH

(71) Applicant: AVISION INC., Hsinchu (TW)

(72) Inventors: Sheng-Yao Shih, Miaoli County (TW); Yung-Hung Tung, Hsinchu (TW)

(73) Assignee: AVISION INC., Hsinchu (TW)

(\*) Notice: Subject to any disclaimer, the term of this patent is extended or adjusted under 35 U.S.C. 154(b) by 0 days.

(21) Appl. No.: 15/924,284

(22) Filed: Mar. 19, 2018

(65) Prior Publication Data
US 2019/0007577 A1    Jan. 3, 2019

(30) Foreign Application Priority Data
Jun. 29, 2017   (TW) .............................. 106209479 U

(51) Int. Cl.
*H04N 1/12* (2006.01)

(52) U.S. Cl.
CPC ............ *H04N 1/123* (2013.01); *H04N 1/1215* (2013.01)

(58) Field of Classification Search
None
See application file for complete search history.

(56) References Cited

U.S. PATENT DOCUMENTS

| 5,771,058 A | * | 6/1998 | Kobayashi | B41J 13/12 |
| | | | | 271/186 |
| 8,363,261 B1 | * | 1/2013 | Zimmerman | B41J 2/16585 |
| | | | | 347/14 |
| 2006/0209366 A1 | * | 9/2006 | Edwards | H04N 1/3876 |
| | | | | 358/498 |
| 2013/0256978 A1 | | 10/2013 | Katayama | |

FOREIGN PATENT DOCUMENTS

| CN | 102469235 A | 5/2012 |
| CN | 204442490 U | 7/2015 |
| CN | 205204331 U | 5/2016 |
| CN | 207442982 U | 6/2018 |

\* cited by examiner

*Primary Examiner* — Thomas D Lee
(74) *Attorney, Agent, or Firm* — Winston Hsu

(57) ABSTRACT

A scanner includes an image capturing module, a drive roller assembly, an idle roller assembly, and a guiding structure. The image capturing module is for capturing an image of an object. The drive roller assembly is for driving the object to move along a feeding direction. The idle roller assembly is for preventing a moving direction of the object away from the feeding direction by resiliently pressing the object. A feeding passage is formed between the drive roller assembly and the idle roller assembly. The guiding structure is disposed in front of the feeding passage and for guiding a normal direction of a leading edge of the object to be oblique relative to the feeding direction at an oblique angle. Therefore, the present invention can effectively reduce variation of a resistance force acting on the object as the object moves in the feeding path, which prevents image distortion.

17 Claims, 9 Drawing Sheets

GUIDING STRUCTURE ADAPTED FOR A SCANNER AND CAPABLE OF PREVENTING IMAGE DISTORTION AND SCANNER THEREWITH

BACKGROUND OF THE INVENTION

1. Field of the Invention

The present invention relates to a guiding structure adapted for a scanner and a scanner therewith, and more particularly, to a guiding structure adapted for a scanner and capable of preventing image distortion and a scanner therewith.

2. Description of the Prior Art

Nowadays most scanners can be applied for paper and cards with different thicknesses to satisfy customers' needs. Since there is variation between a thickness of a card, which is usually about from 0.8 to 1.25 mm, and a thickness of paper, which is usually about 0.1 mm, a scanner is usually equipped with a resilient component connected to an idle roller, so that the idle roller can move up and down relative to a drive roller by cooperation of the idle roller and a scanning object and compression of the resilient component. Therefore, a height of a feeding passage between the idle roller and the drive roller can be adjusted according to a thickness of the scanning object.

However, the thicker object brings the greater deformation of the resilient component, which causes large force variation acting on the scanning object when the scanning object contacts with or leave from the idle roller. For example, please refer to FIG. 8 and FIG. 9. FIG. 8 is a force-position (F'-Z') diagram of an object 2' scanned by a conventional scanner in the prior art. FIG. 9 is a diagram of an image of the object 2' scanned by the conventional scanner in the prior art. When the object 2' moves along a feeding direction D' to drive a leading edge of the object 2' to contact with a front idle roller assembly 13', the front idle roller assembly 13' moves upwardly to compress the resilient component, which is not shown in figures, so that the resilient component generates a resilient force to push the front idle roller assembly 13' to press the object 2' downwardly. At this moment, the force F' acting on the object 2' increases suddenly, as shown in Z1' portion. When the object 2' continues to move along the feeding direction D' to drive the leading edge of the object 2' to contact with the rear idle roller assembly 13', the rear idle roller assembly 13' moves upwardly to compress the resilient component, so that the resilient component generates a resilient force to push the rear idle roller assembly 13' to press the object 2' downwardly. At this moment, the force F' acting on the object 2' increases suddenly again, as shown in Z2' portion. When the object 2' moves along the feeding direction D' to drive a rear edge of the object 2' to leave from the front idle roller assembly 13', the front idle roller assembly 13' does not press the object 2' any more. At this moment, the force F' acting on the object 2' decreases suddenly, as shown in Z3' portion. When the object 2' moves along the feeding direction D' to drive the rear edge to leave from the rear idle roller assembly 13', the rear idle roller assembly 13' does not press the object 2' any more. At this moment, the force F' acting on the object 2' decreases suddenly again, as shown in Z4' portion. From the above, the force F' acting on the object 2' dramatically varies because of impacts of resistance and release of the idle roller assemblies 13' during a process that the object 2' passes through a feeding passage of the scanner, which causes an uneven moving speed of the object 2'. Therefore, it may result in image distortion, as shown in FIG. 9.

SUMMARY OF THE INVENTION

Therefore, an objective of the present invention is to provide a guiding structure adapted for a scanner and capable of preventing image distortion and a scanner therewith for solving the aforementioned problems.

In order to achieve the aforementioned objective, the present invention discloses a scanner capable of preventing image distortion. The scanner includes a casing, an image capturing module, at least one drive roller assembly, at least one idle roller assembly and a guiding structure. The image capturing module is disposed inside the casing and for capturing an image of an object. The at least one drive roller assembly is disposed inside the casing in a rotatable manner and for driving the object to move along a feeding direction. The at least one idle roller assembly is disposed inside the casing and to be rotated by the object. The at least one idle roller assembly is located at a position opposite to the at least one drive roller assembly. A feeding passage is formed between the at least one drive roller assembly and the at least one idle roller assembly. The at least one idle roller assembly resiliently presses the object downwardly for preventing a moving direction of the object from deviating from the feeding direction when the at least one drive roller assembly drives the object to move in the feeding passage along the feeding direction. The guiding structure is disposed in front of the feeding passage and for guiding a normal direction of a leading edge of the object to be oblique relative to the feeding direction at an oblique angle, so as to guide the object to enter into the feeding passage obliquely.

According to an embodiment of the present invention, the guiding structure includes at least one guiding rib, and a longitudinal direction of the at least one guiding rib is oblique relative to the feeding direction at the oblique angle.

According to an embodiment of the present invention, the guiding structure includes two guiding ribs, and a distance between the two guiding ribs is substantially equal to a length of the leading edge of the object.

According to an embodiment of the present invention, the oblique angle is substantially from 4 to 10 degrees.

According to an embodiment of the present invention, the oblique angle is substantially from 5 to 7 degrees.

According to an embodiment of the present invention, the oblique angle is substantially 6 degrees.

According to an embodiment of the present invention, the at least one idle roller assembly includes at least one resilient component, at least one idle roller and a shaft. The shaft is movably installed inside the casing. The at least one idle roller is rotatably disposed on the shaft. The at least one resilient component is connected to the shaft and the casing. When the object contacts with the at least one idle roller, the shaft is raised to compress the at least one resilient component, so that the at least one resilient component generates a resilient force to push the shaft to drive the at least one idle roller to press the object downwardly.

According to an embodiment of the present invention, the scanner includes two drive roller assemblies and two idle roller assemblies, and the image capturing module is disposed between the two idle roller assemblies.

According to an embodiment of the present invention, a distance between the two drive roller assemblies is substantially equal to a distance between the two idle roller assemblies, and the distance between the two drive roller assemblies and the distance between the two idle roller assemblies are substantially less than a projection length of a side of the object along the feeding direction.

According to an embodiment of the present invention, the scanner further includes a control unit electrically connected to the image capturing module and for calibrating the image of the object captured by the image capturing module when the object obliquely enters into the feeding passage.

In order to achieve the aforementioned objective, the present invention further discloses a guiding structure adapted for a scanner and capable of preventing image distortion. The guiding structure includes a base plate and at least one guiding rib. The base plate is disposed in front of a feeding passage of the scanner. The at least one guiding rib is disposed on the base plate, a longitudinal direction of the at least one guiding rib being oblique relative to a feeding direction of the scanner at an oblique angle for guiding a normal direction of a leading edge of an object to be oblique relative to the feeding direction at an oblique angle, so as to guide the object to enter into the feeding passage obliquely.

According to an embodiment of the present invention, the guiding structure includes two guiding ribs, and a distance between the two guiding ribs is substantially equal to a length of the leading edge of the object.

According to an embodiment of the present invention, the oblique angle is substantially from 4 to 10 degrees.

According to an embodiment of the present invention, the oblique angle is substantially from 5 to 7 degrees.

According to an embodiment of the present invention, the oblique angle is substantially 6 degrees.

In summary, the scanner of the present invention utilizes the guiding structure for guiding normal directions of the leading edge and a rear edge of the object to be oblique relative to the feeding direction at the oblique angle, so that the force acting on the object can vary smoothly when the leading edge and the rear edge of the object contact with and leave from the drive roller assembly and the idle roller assembly, which ensures an even moving speed of the object. Therefore, it can prevent image distortion and enhance scanning quality. Furthermore, the scanner of the present invention further utilizes the control unit for rotating and cutting the image captured by the image capturing module, which prevents reading difficulty caused by an angular difference between a coordinate of the scanned image and an actual coordinate.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
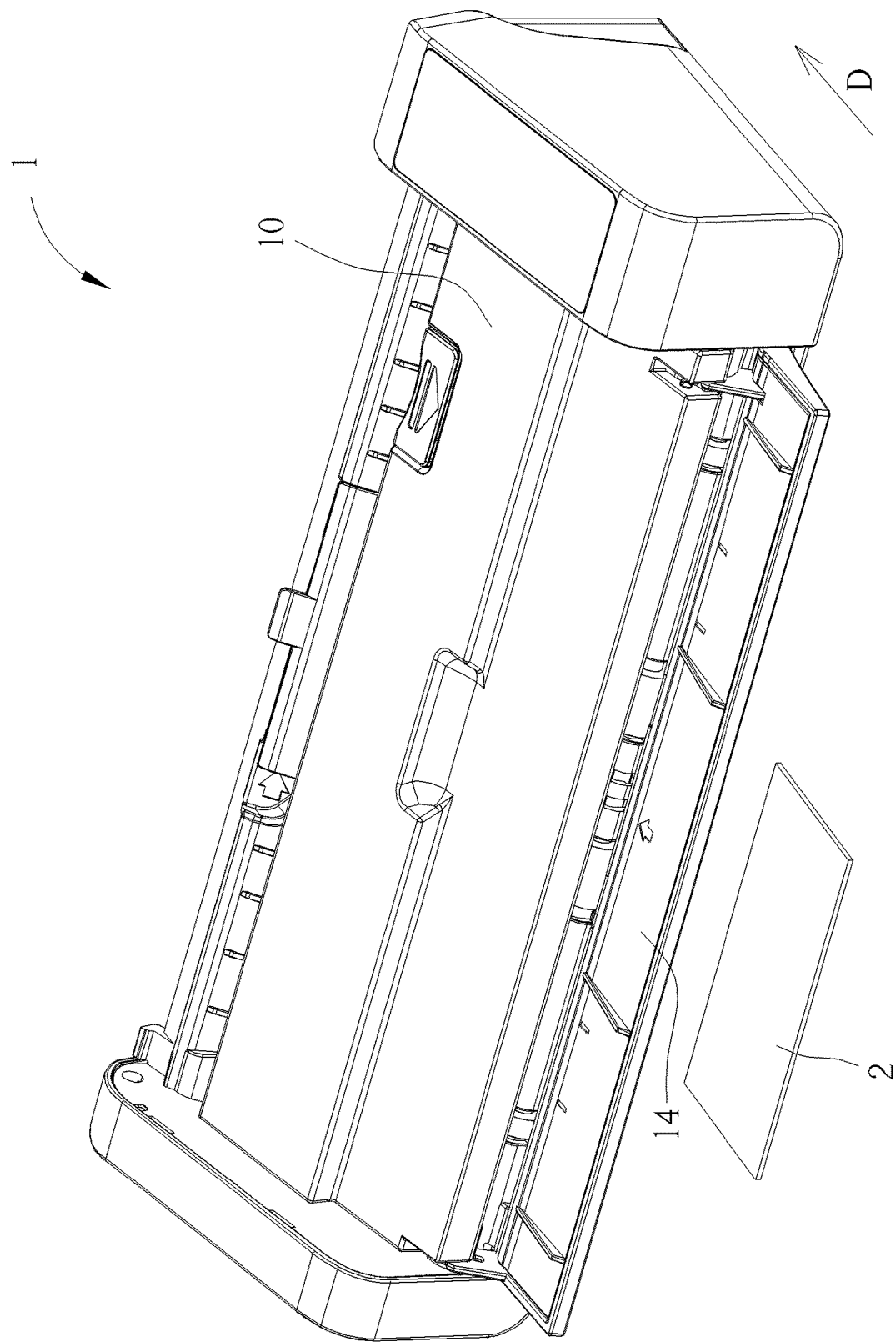
FIG. 1 is a schematic diagram of a scanner according to an embodiment of the present invention.
Figure 2:
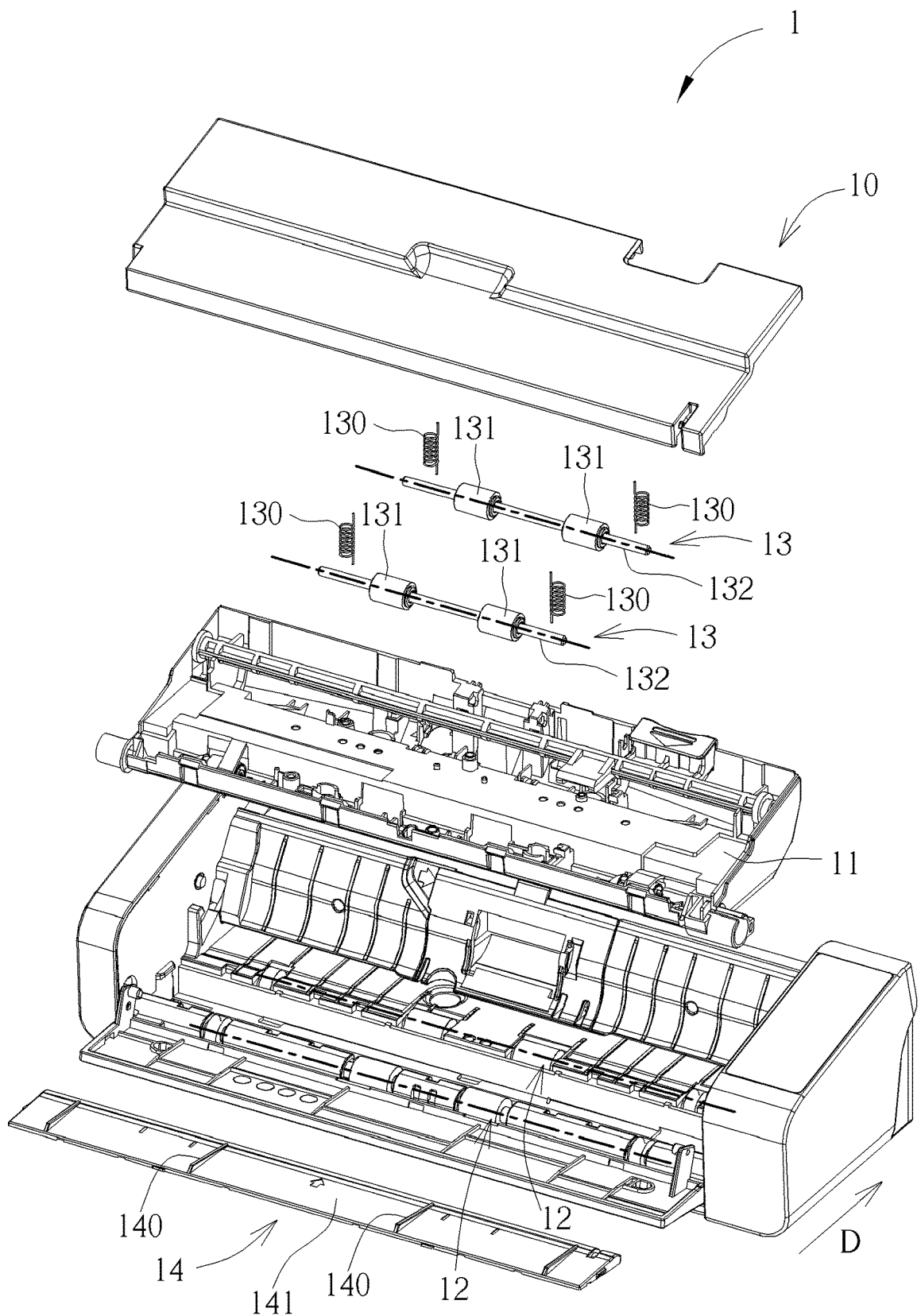
FIG. 2 is a partial exploded diagram of the scanner according to the embodiment of the present invention.
Figure 3:
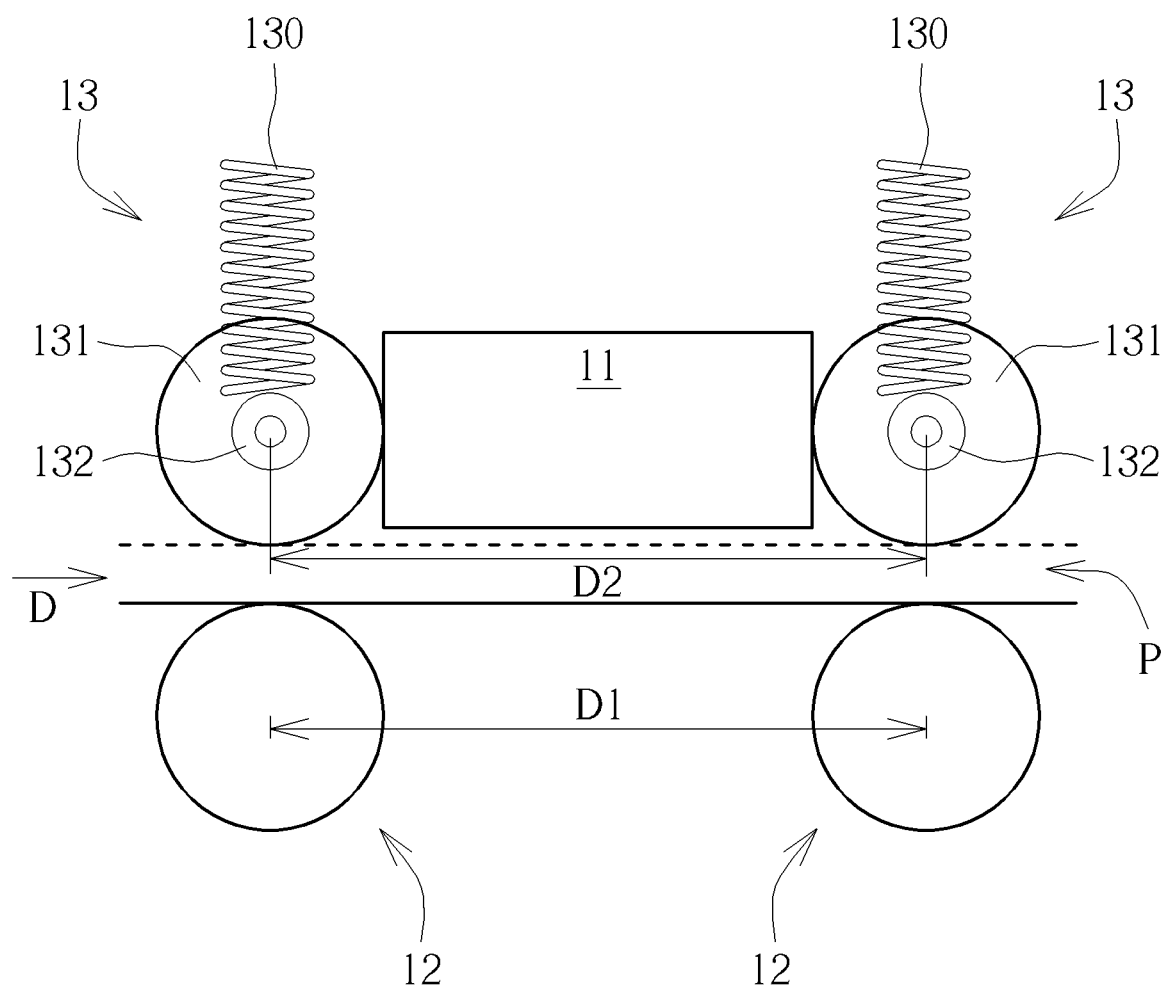
FIG. 3 is a partial internal diagram of the scanner according to the embodiment of the present invention.
Figure 4:
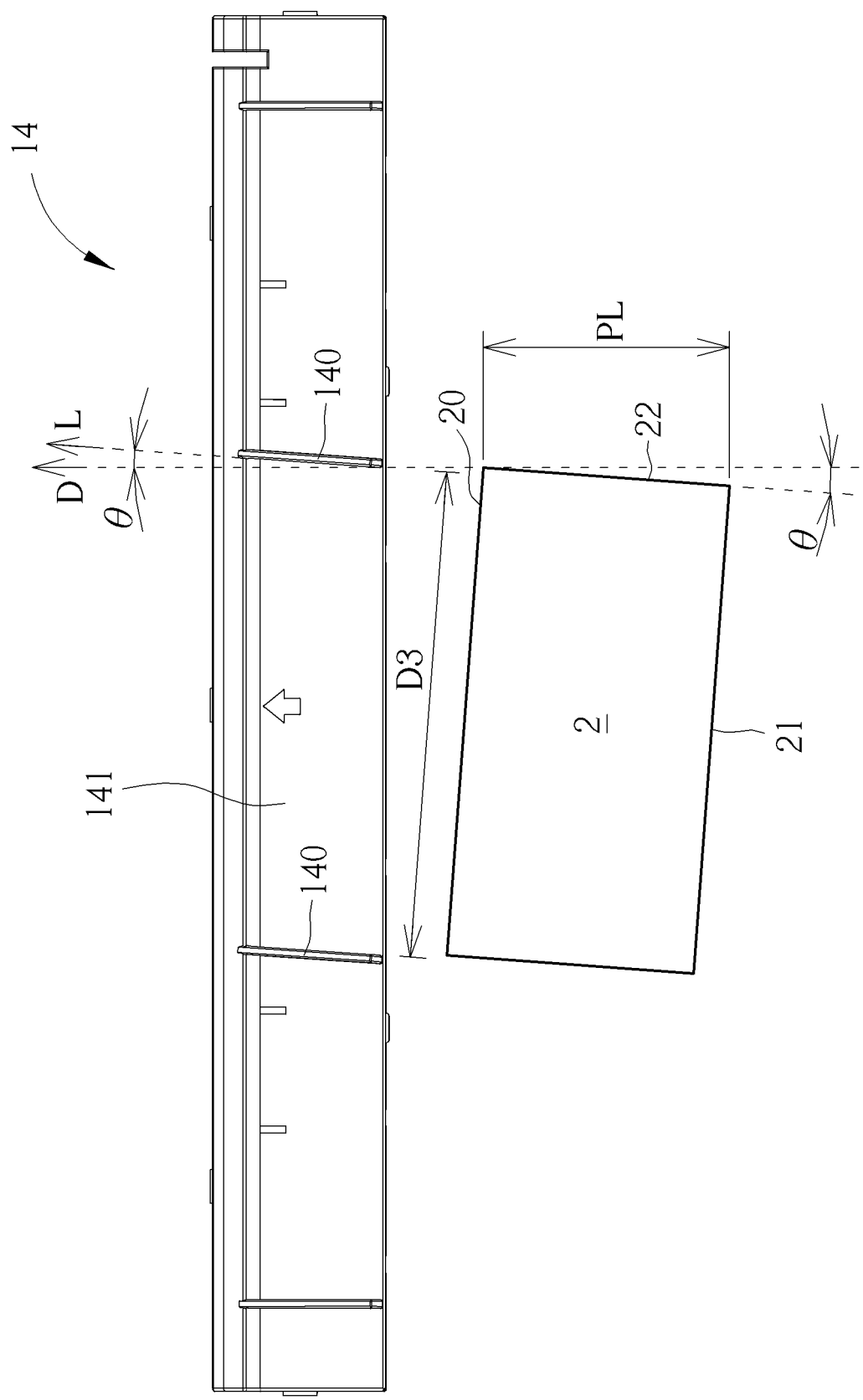
FIG. 4 is a diagram of a guiding structure and an object according to the embodiment of the present invention.

Please refer to FIG. 1 to FIG. 3. FIG. 1 is a schematic diagram of a scanner 1 according to an embodiment of the present invention. FIG. 2 is a partial exploded diagram of the scanner 1 according to the embodiment of the present invention. FIG. 3 is a partial internal diagram of the scanner 1 according to the embodiment of the present invention. As shown in FIG. 1 to FIG. 3, the scanner 1 includes a casing 10, an image capturing module 11, two drive roller assemblies 12, two idle roller assemblies 13 and a guiding structure 14. The image capturing module 11 is disposed inside the casing 10 and for capturing an image of an object 2. In this embodiment, the object 2 can be a rigid card or a sheet of soft paper. The two drive roller assemblies 12 are disposed inside the casing 10 in a rotatable manner and for driving the object 2 to move along a feeding direction D. The two idle roller assemblies 13 are disposed inside the casing 10 and to be rotated by the object 2. The two idle roller assemblies 13 are located at positions opposite to the two drive roller assemblies 12. A feeding passage P is formed between the two drive roller assemblies 12 and the two idle roller assemblies 13. The two idle roller assemblies 13 resiliently press the object 2 downwardly for preventing a moving direction of the object 2 from deviating from the feeding direction D when the two drive roller assemblies 12 drive the object 2 to move in the feeding passage P along the feeding direction D. In this embodiment, a distance D1 between the two drive roller assemblies 12 can be preferably substantially equal to a distance D2 between the two idle roller assemblies 13. Please refer to FIG. 3 and FIG. 4. FIG. 4 is a diagram of the guiding structure 14 and the object 2 according to the embodiment of the present invention. As shown in FIG. 3 and FIG. 4, the distance D1 between the two drive roller assemblies 12 and the distance D2 between the two idle roller assemblies 13 can be substantially less than a projection length PL of a side 22 of the object 2 along the feeding direction D, so as to ensure that the object 2 can be driven by the two drive roller assemblies 12 to move along the feeding direction D continuously.

As shown in FIG. 2 and FIG. 3, each of the two idle roller assemblies 13 includes two resilient components 130, two idle rollers 131 and a shaft 132. The shaft 132 is movably installed inside the casing 10. The two idle rollers 131 are rotatably disposed on the shaft 132. The two resilient components 130 are connected to the shaft 132 and the casing 10 or other fixing structure. When the object 2 contacts with the two idle rollers 131, the shaft 132 is raised to compress the two resilient components 130, so that the two resilient components 130 generate resilient forces to push the shaft 132 to drive the two idle rollers 131 to press the object 2 downwardly. However, the numbers and the configurations of the drive roller assembly 12 and the idle roller assembly 13 of the present invention are not limited to those illustrated in the figures of this embodiment. It depends on practical demands.

As shown in FIG. 1, FIG. 2 and FIG. 4, the guiding structure 14 is disposed in front of the feeding passage P and for guiding a normal direction of a leading edge 20 of the object 2 to be oblique relative to the feeding direction D at an oblique angle θ, so as to guide the object 2 to enter into the feeding passage P obliquely. In this embodiment, the guiding structure 14 can preferably include two guiding ribs 140 and a base plate 141. The base plate 141 is disposed in front of the feeding passage P. The two guiding ribs 140 are oppositely disposed on the base plate 141. A distance D3 between the two guiding ribs 140 can be substantially equal to a length of the leading edge 20 of the object 2. A longitudinal direction L of each of the two guiding ribs 140 is oblique relative to the feeding direction D at the oblique angle θ, i.e., the longitudinal direction L is substantially parallel to the normal direction of the leading edge 20. Furthermore, in this embodiment, the oblique angle θ can be preferably 6 degrees. However, the oblique angle θ is not limited to thereto. In another embodiment, the oblique angle θ also can be from 4 to 10 degrees or from 5 to 7 degrees. When it is desired to scan the object 2 by the scanner 1 of present invention, the object 2 can be placed between the two guiding ribs 140, so that the normal direction of the leading edge 20 of the object 2 can be guided by the two guiding ribs 140 to be oblique relative to the feeding direction D at the oblique angle θ when the leading edge 20 of the object 2 enters the feeding passage P. Similarly, a normal direction of a rear edge 21 of the object 2 opposite to the leading edge 20 of the object 2 also can be guided by the two guiding ribs 140 to be oblique relative to the feeding direction D at the oblique angle θ when the rear edge 21 of the object 2 enters the feeding passage P.

Figure 5:
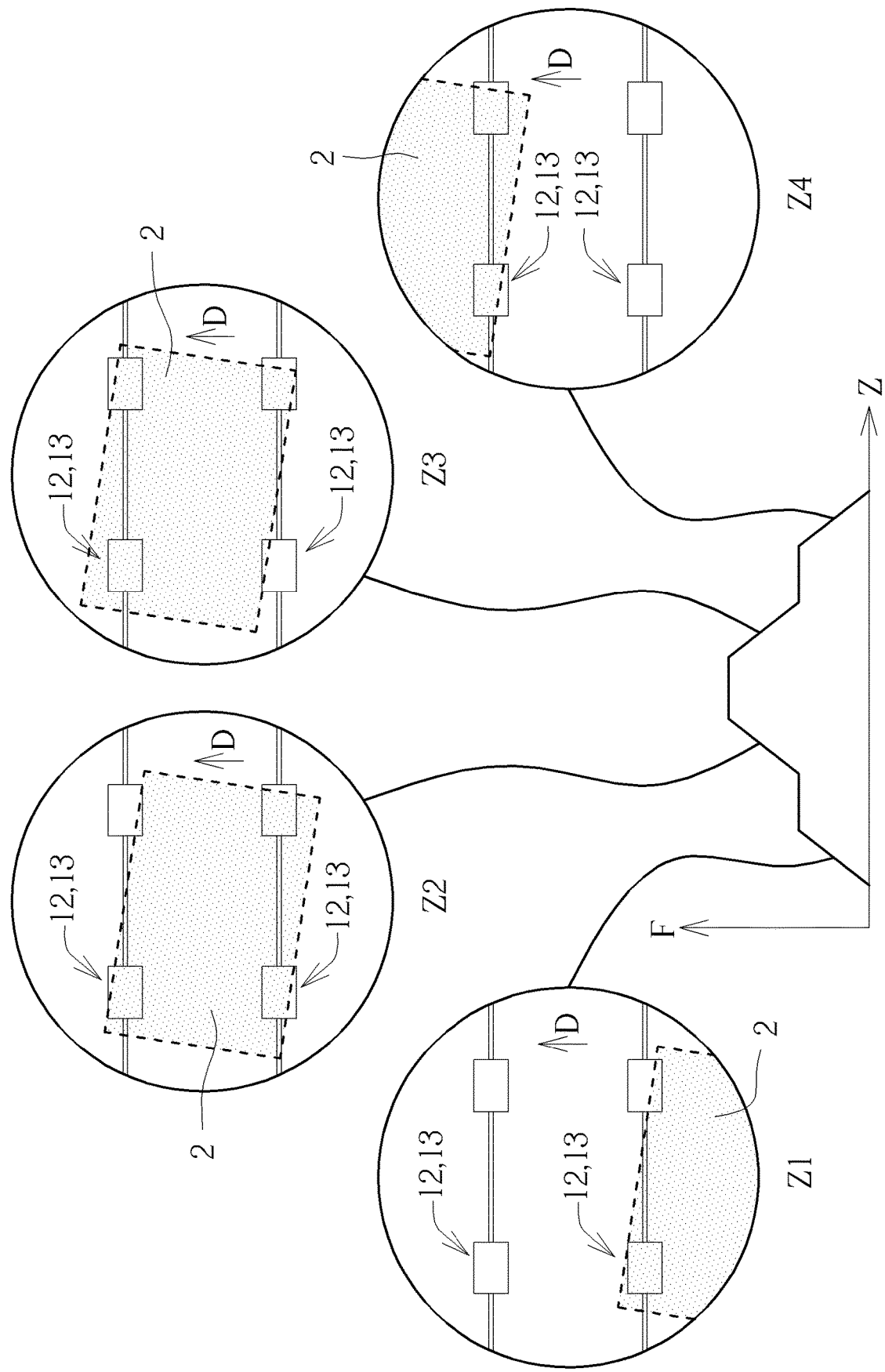
FIG. 5 is a force-position diagram of the object scanned by the scanner according to the embodiment of the present invention.
Figure 6:
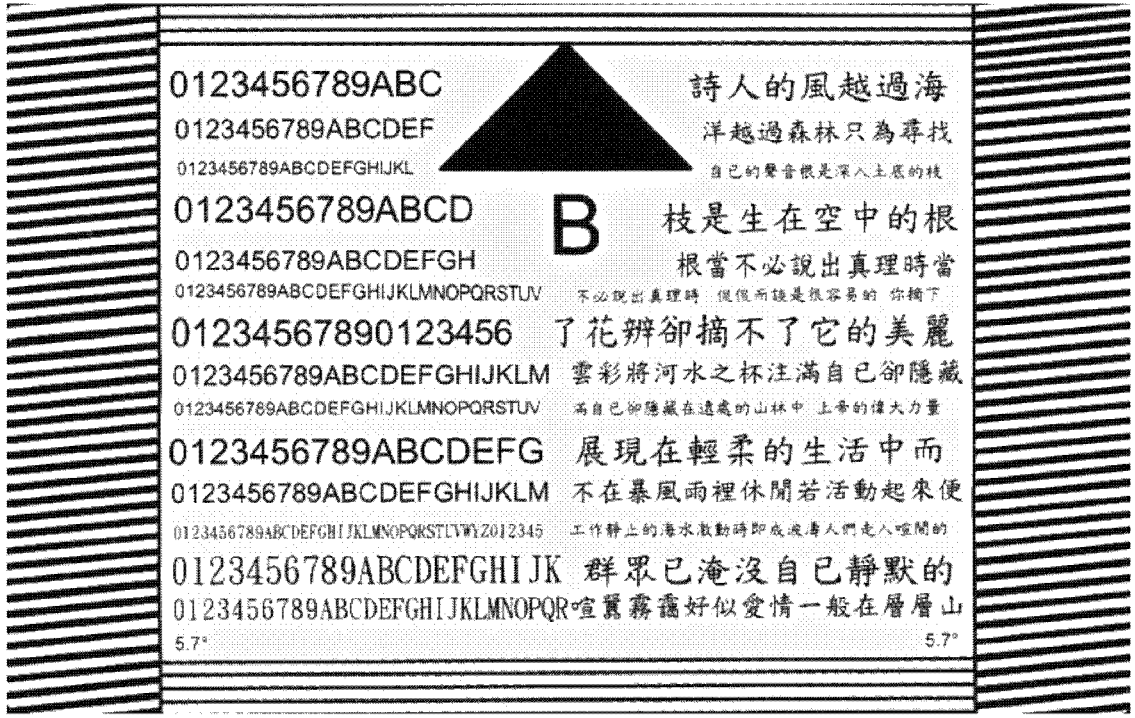
FIG. 6 is a diagram of an image of the object scanned by the scanner according to the embodiment of the present invention.

Please further refer to FIG. 5 and FIG. 6. FIG. 5 is a force-position (F-Z) diagram of the object 2 scanned by the scanner 1 according to the embodiment of the present invention. FIG. 6 is a diagram of the image of the object 2 scanned by the scanner 1 according to the embodiment of the present invention. As shown in FIG. 3, FIG. 5 and FIG. 6, when the leading edge 20 of the object 2 is ready to enter the feeding passage P, the leading edge 20 of the object 2 gradually contacts with the first drive roller assembly 12 and the first idle roller assembly 13 from left to right. The two resilient components 130 of the first idle roller assembly 13 are compressed gradually along with gradual increases of contacting area of the object 2 and the first drive roller assembly 12 and of contacting area of the object 2 and the first idle roller assembly 13. In such a way, the force F acting on the object 2 increases gradually, as shown in Z1 portion of FIG. 5, and the object 2 can be driven by the first drive roller assembly 12 to move along the feeding direction D in the feeding passage P. Afterwards, when the object 2 passes through the image capturing module 11 along the feeding direction D, the image capturing module 11 starts capturing the image of the object 2.

When the leading edge 20 of the object 2 is about to leave from the feeding passage P, the leading edge 20 of the object 2 gradually contacts with the second drive roller assembly 12 and the second idle roller assembly 13 from left to right. In other words, at this moment, the leading edge 20 of the object 2 contacts with the second drive roller assembly 12 and the second idle roller assembly 13, and the rear edge 21 of the object 2 contacts with the first drive roller assembly 12 and the first idle roller assembly 13 at the same time. The two resilient components 130 of the second idle roller assembly 13 are compressed gradually along with gradual increases of contacting area of the object 2 and the second drive roller assembly 12 and of contacting area of the object 2 and the second idle roller assembly 13. In such a way, the force F acting on the object 2 increases gradually, as shown in Z2 portion of FIG. 5, until the leading edge 20 completely passes through the second drive roller assembly 12 and the second idle roller assembly 13. It should be noticed that during the aforementioned process, since the force F acting on the object 2 does not increase dramatically, it prevents a moving speed of the object 2 from slowing down suddenly, which prevents image distortion of the image of the object 2 captured by the image capturing module 11.

Afterwards, the rear edge 21 of the object 2 leaves from the first drive assembly 12 and the first idle roller assembly 13 from left to right. The two resilient components 130 of the first idle roller assembly 13 are released gradually along with gradual decreases of the contacting area of the object 2 and the first drive roller assembly 12 and of the contacting area of the object 2 and the first idle roller assembly 13. In such a way, the force F acting on the object 2 decreases gradually, as shown in Z3 portion of FIG. 5, until the rear edge 21 of the object 2 completely passes through the first drive roller assembly 12 and the first idle roller assembly 13. It should be noticed that during the aforementioned process, since the force F acting on the object 2 does not decrease dramatically, it prevents the moving speed of the object 2 from speeding up suddenly, which prevents image distortion of the image of the object 2 captured by the image capturing module 11. At last, the rear edge 21 of the object 2 leaves from the second drive assembly 12 and the second idle roller assembly 13 from left to right. The two resilient components 130 of the second idle roller assembly 13 are released gradually along with gradual decreases of the contacting area of the object 2 and the second drive roller assembly 12 and of the contacting area of the object 2 and the second idle roller assembly 13. In such a way, the force F acting on the object 2 decreases gradually, as shown in Z4 portion of FIG. 5, until the rear edge 21 of the object 2 completely passes through the second drive roller assembly 12 and the second idle roller assembly 13 to leave from the feeding passage P. It should be noticed that during the aforementioned process, since the force F acting on the object 2 does not decrease dramatically, it prevents the moving speed of the object 2 from speeding up suddenly, which prevents image distortion of the image of the object 2 captured by the image capturing module 11.

As mentioned above, since normal directions of the leading edge 20 and the rear edge 21 of the object 2 are oblique relative to the feeding direction D at the oblique angle θ, the contacting areas of the leading edge 20 and the rear edge 21 of the object 2 and the drive roller assemblies 12 and the idle roller assemblies 13 increase and decrease gradually. Therefore, it prevents impacts of resistance and release of the roller assemblies, i.e., the forcing acting on the object 2 increases and decreases gradually, which ensures the even moving speed of the object 2 and prevents image distortion. Furthermore, in the present invention, the guiding ribs 140 of the guiding structure 14 for guiding the object 2 to enter the feeding passage P obliquely also can be replaced by an interference structure for hitting the object 2 to drive the object 2 to obliquely enter the feeding passage P. In other words, structure allows the normal directions of the leading edge and the rear edge of the object to be oblique relative to the feeding direction is included within the scope of the present invention. It depends on practical demands.

Figure 7:
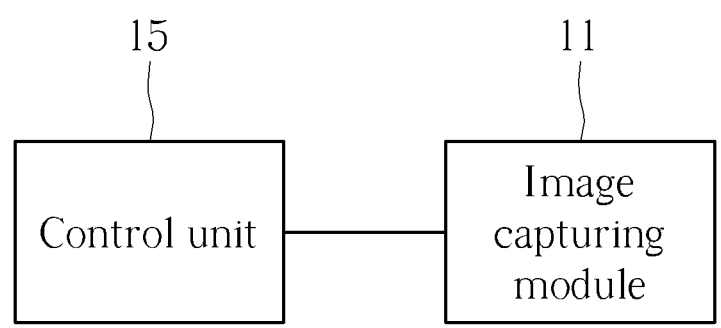
FIG. 7 is a partial functional block diagram of the scanner according to the embodiment of the present invention.
Figure 8:
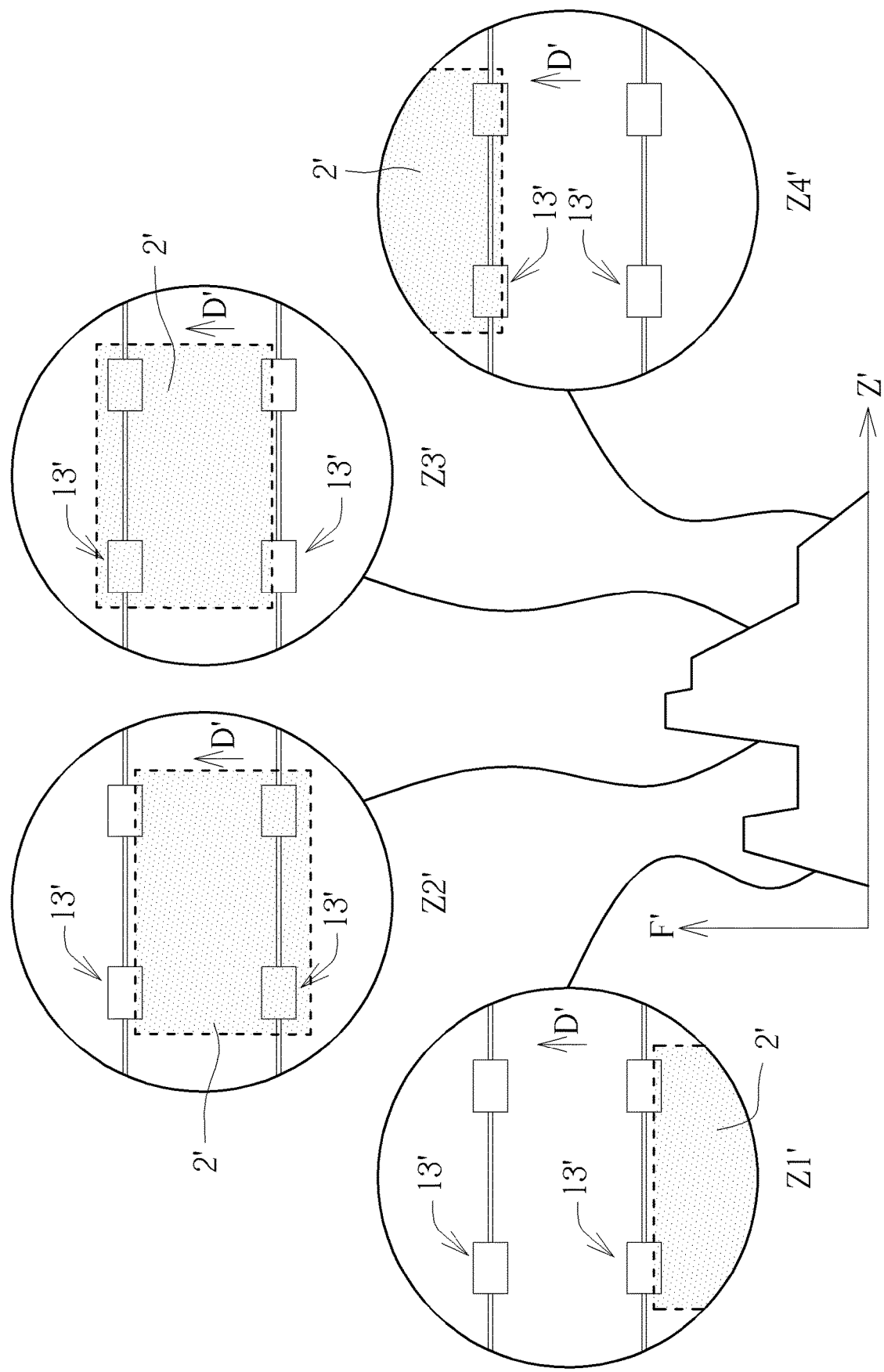
FIG. 8 is a force-position diagram of an object scanned by a conventional scanner in the prior art.
Figure 9:
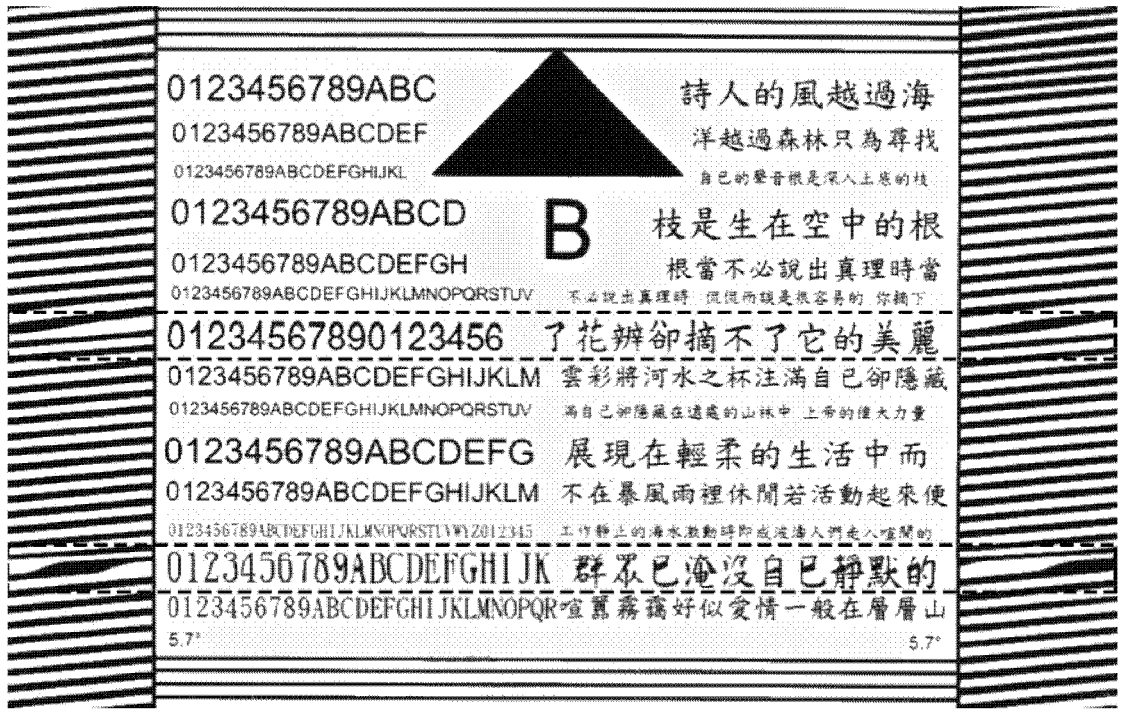
FIG. 9 is a diagram of an image of the object scanned by the conventional scanner in the prior art.

Furthermore, please refer to FIG. 7. FIG. 7 is a partial functional block diagram of the scanner 1 according to the embodiment of the present invention. As shown in FIG. 7, in this embodiment, the scanner 1 can further include a control unit 15 electrically connected to the image capturing module 11 and for calibrating the image of the object 2 captured by the image capturing module 11. As mentioned above, since the object 2 passes though the feeding passage P obliquely, there is an angular difference between a coordinate of the image and an actual coordinate. The control unit 15 can generate a corrected image by rotating and cutting the image captured by the image capturing module 11, which helps users to watch or read easily.

In contrast to the prior art, the scanner of the present invention utilizes the guiding structure for guiding normal directions of the leading edge and the rear edge of the object to be oblique relative to the feeding direction at the oblique angle, so that the force acting on the object can vary smoothly when the leading edge and the rear edge of the object contact with and leave from the drive roller assembly and the idle roller assembly, which ensures the even moving speed of the object. Therefore, it can prevent image distortion and enhance scanning quality. Furthermore, the scanner of the present invention further utilizes the control unit for rotating and cutting the image captured by the image capturing module, which prevents reading difficulty caused by the angular difference between the coordinate of the scanned image and the actual coordinate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scanner capable of preventing image distortion, the scanner comprising:
    a casing;
    an image capturing module disposed inside the casing and for capturing an image of an object;
    at least one drive roller assembly disposed inside the casing in a rotatable manner and for driving the object to move along a feeding direction;
    at least one idle roller assembly disposed inside the casing and to be rotated by the object, the at least one idle roller assembly being located at a position opposite to the at least one drive roller assembly, a feeding passage being formed between the at least one drive roller assembly and the at least one idle roller assembly, the at least one idle roller assembly resiliently pressing the object downwardly for preventing a moving direction of the object from deviating from the feeding direction when the at least one drive roller assembly drives the object to move in the feeding passage along the feeding direction; and
    a guiding structure disposed in front of the feeding passage and comprising two guiding ribs, and a distance between the two guiding ribs being substantially equal to a length of the leading edge of the object, a longitudinal direction of each of the two guiding ribs being oblique relative to the feeding direction at an oblique angle for guiding a normal direction of a leading edge of the object to be oblique relative to the feeding direction at the oblique angle, so as to guide the object to enter into the feeding passage obliquely.

2. The scanner of claim 1, wherein the oblique angle is substantially from 4 to 10 degrees.

3. The scanner of claim 1, wherein the oblique angle is substantially from 5 to 7 degrees.

4. The scanner of claim 1, wherein the oblique angle is substantially 6 degrees.

5. The scanner of claim 1, wherein the at least one idle roller assembly comprises at least one resilient component, at least one idle roller and a shaft, the shaft is movably installed inside the casing, the at least one idle roller is rotatably disposed on the shaft, the at least one resilient component is connected to the shaft and the casing, and when the object contacts with the at least one idle roller, the shaft is raised to compress the at least one resilient component, so that the at least one resilient component generates a resilient force to push the shaft to drive the at least one idle roller to press the object downwardly.

6. The scanner of claim 1, comprising two drive roller assemblies and two idle roller assemblies, and the image capturing module being disposed between the two idle roller assemblies.

7. The scanner of claim 6, wherein a distance between the two drive roller assemblies is substantially equal to a distance between the two idle roller assemblies, and the distance between the two drive roller assemblies and the distance between the two idle roller assemblies are substantially less than a projection length of a side of the object along the feeding direction.

8. The scanner of claim 1, further comprising a control circuit electrically connected to the image capturing module and for calibrating the image of the object captured by the image capturing module after the object obliquely enters into the feeding passage.

9. A guiding structure adapted for a scanner and capable of preventing image distortion, the guiding structure comprising:
    a base plate disposed in front of a feeding passage of the scanner; and
    two guiding ribs disposed on the base plate, a distance between the two guiding ribs being substantially equal to a length of the leading edge of the object, a longitudinal direction of each of the two guiding ribs being oblique relative to a feeding direction of the scanner at an oblique angle for guiding a normal direction of a leading edge of an object to be oblique relative to the feeding direction at an oblique angle, so as to guide the object to enter into the feeding passage obliquely.

10. The guiding structure of claim 9, wherein the oblique angle is substantially from 4 to 10 degrees.

11. The guiding structure of claim 9, wherein the oblique angle is substantially from 5 to 7 degrees.

12. The guiding structure of claim 9, wherein the oblique angle is substantially 6 degrees.

13. A scanner capable of preventing image distortion, the scanner comprising:
    a casing;
    an image capturing module disposed inside the casing and for capturing an image of an object;

at least one drive roller assembly disposed inside the casing in a rotatable manner and for driving the object to move along a feeding direction;

at least one idle roller assembly disposed inside the casing and to be rotated by the object, the at least one idle roller assembly being located at a position opposite to the at least one drive roller assembly, a feeding passage being formed between the at least one drive roller assembly and the at least one idle roller assembly, the at least one idle roller assembly resiliently pressing the object downwardly for preventing a moving direction of the object from deviating from the feeding direction when the at least one drive roller assembly drives the object to move in the feeding passage along the feeding direction;

a guiding structure disposed in front of the feeding passage and for guiding a normal direction of a leading edge of the object to be oblique relative to the feeding direction at an oblique angle, so as to guide the object to enter into the feeding passage obliquely; and a control circuit electrically connected to the image capturing module and for calibrating the image of the object captured by the image capturing module after the object obliquely enters into the feeding passage.

14. The scanner of claim 13, wherein the guiding structure comprises at least one guiding rib, and a longitudinal direction of the at least one guiding rib is oblique relative to the feeding direction at the oblique angle.

15. The scanner of claim 13, wherein the at least one idle roller assembly comprises at least one resilient component, at least one idle roller and a shaft, the shaft is movably installed inside the casing, the at least one idle roller is rotatably disposed on the shaft, the at least one resilient component is connected to the shaft and the casing, and when the object contacts with the at least one idle roller, the shaft is raised to compress the at least one resilient component, so that the at least one resilient component generates a resilient force to push the shaft to drive the at least one idle roller to press the object downwardly.

16. The scanner of claim 13, comprising two drive roller assemblies and two idle roller assemblies, and the image capturing module being disposed between the two idle roller assemblies.

17. The scanner of claim 16, wherein a distance between the two drive roller assemblies is substantially equal to a distance between the two idle roller assemblies, and the distance between the two drive roller assemblies and the distance between the two idle roller assemblies are substantially less than a projection length of a side of the object along the feeding direction.

* * * * *